United States Patent [19]
Hamblin

[11] Patent Number: 4,948,320
[45] Date of Patent: Aug. 14, 1990

[54] PREVENTING MOVEMENT OF AN ARTICLE ALONG A SHAFT OR BORE

[75] Inventor: Ronald F. Hamblin, Luton, England
[73] Assignee: Skf (U K) Limited, Luton, England
[21] Appl. No.: 400,491
[22] Filed: Aug. 30, 1989

Related U.S. Application Data

[62] Division of Ser. No. 815,566, Jan. 2, 1986, Pat. No. 4,887,919.

[30] Foreign Application Priority Data

Jan. 8, 1985 [GB] United Kingdom ............... 8500396

[51] Int. Cl.$^5$ .............................. F16B 2/00
[52] U.S. Cl. ........................... 411/511; 29/256; 29/426.5; 384/538; 384/542; 384/562; 384/585; 384/620; 403/16; 403/345; 403/373; 411/517; 411/542
[58] Field of Search ............... 411/521, 520, 517, 516, 411/511, 542; 403/16, 373, 345, 370, 367, 368; 29/256, 426.5; 220/352; 384/542, 617, 620, 585, 510, 538, 559, 560, 562

[56] References Cited

U.S. PATENT DOCUMENTS

| | | | |
|---|---|---|---|
| 1,306,641 | 6/1919 | Steenstrup | 220/352 |
| 1,368,050 | 2/1921 | Plaisted | 384/542 |
| 1,697,050 | 1/1929 | Delaval-Crow | 384/542 |
| 2,207,008 | 7/1940 | Hocher | 403/345 X |
| 2,293,943 | 8/1942 | Merker et al. | 220/352 X |
| 2,428,884 | 10/1947 | Lefren | 220/352 X |
| 3,106,256 | 10/1963 | McBride | 411/516 X |
| 3,108,839 | 10/1963 | Johnson | 384/510 |
| 3,320,846 | 5/1967 | Orain | 411/521 |
| 3,402,947 | 9/1968 | Lewis | 411/511 X |
| 3,428,373 | 2/1969 | Imse | 384/562 |
| 3,608,987 | 9/1971 | Jordan | 384/538 |
| 3,890,020 | 6/1975 | Thomas | 384/559 |
| 3,993,397 | 11/1976 | Gutshall | 411/533 X |
| 4,037,384 | 7/1977 | Molyneux | 411/368 X |
| 4,115,016 | 9/1978 | Muellenberg | 403/16 |
| 4,295,766 | 10/1981 | Shaw | 411/542 X |
| 4,338,036 | 7/1982 | DeLeu | 403/370 X |
| 4,525,094 | 6/1985 | Johnson et al. | 403/16 X |
| 4,705,032 | 11/1987 | Keller | 411/344 X |
| 4,730,965 | 3/1988 | Alten | 411/15 |

FOREIGN PATENT DOCUMENTS

| | | |
|---|---|---|
| 853227 | 10/1952 | Fed. Rep. of Germany ...... 411/517 |
| 182914 | 8/1955 | Fed. Rep. of Germany ...... 411/517 |
| 2547366 | 4/1977 | Fed. Rep. of Germany . |
| 2824687 | 12/1979 | Fed. Rep. of Germany ...... 384/585 |
| 904788 | 3/1945 | France . |
| 1175299 | 3/1959 | France ............................ 384/542 |
| 0003315 | 1/1981 | Japan ............................. 384/542 |
| WO82/01750 | 5/1982 | PCT Int'l Appl. . |
| 279991 | 4/1952 | Switzerland ................... 411/517 |
| 0838131 | 6/1981 | U.S.S.R. ......................... 384/539 |
| 1392182 | 4/1975 | United Kingdom . |
| 1519583 | 8/1978 | United Kingdom . |

Primary Examiner—Lloyd A. Gall
Attorney, Agent, or Firm—Eugene E. Renz, Jr.

[57] ABSTRACT

To prevent movement of an article along a shaft or a bore, an element engages the article and engages the shaft or bore at locations forming an angle no greater than $\tan^{-1}\mu$.

The locations of engagement lie in a first plane extending perpendicular to a second plane in which lies the axis of the bore or shaft. A third plane extends perpendicular to the axis. The angle is between the first and third planes. $\mu$ is the coefficient of friction between the element and the bore or shaft.

9 Claims, 7 Drawing Sheets

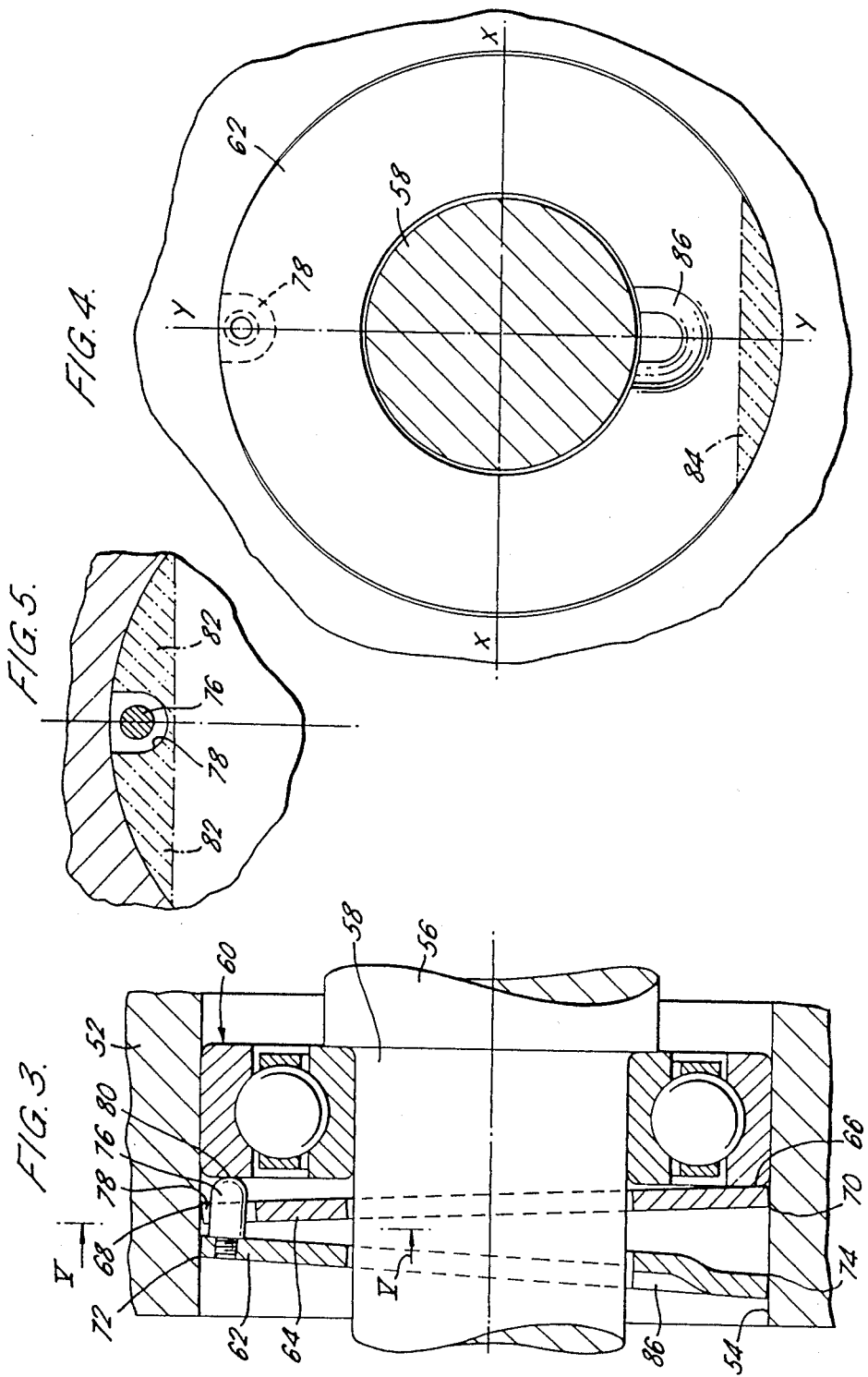

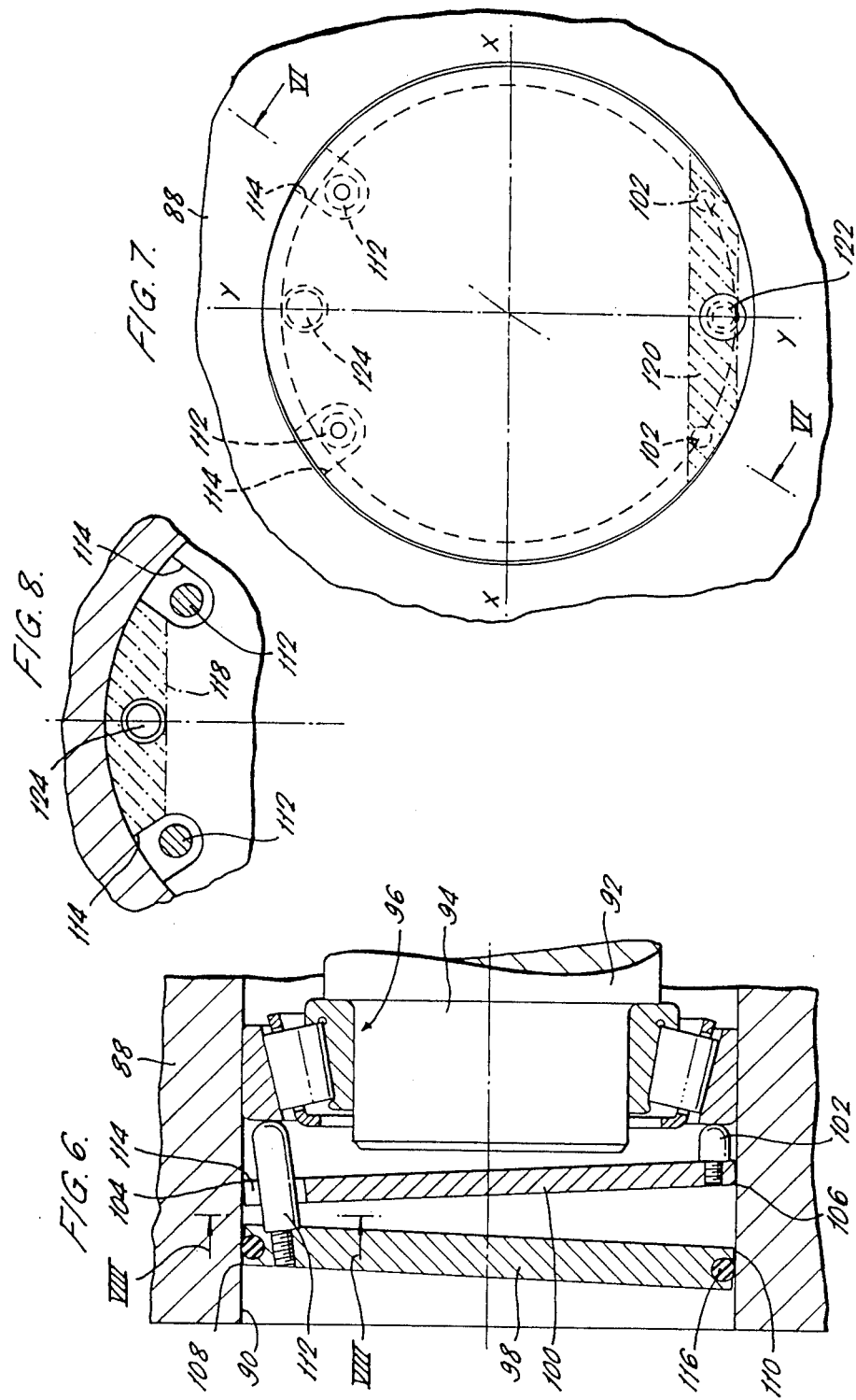

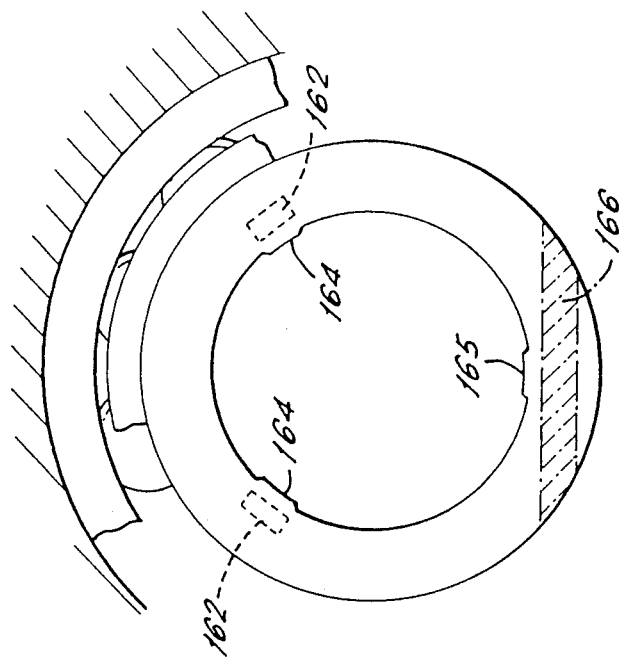
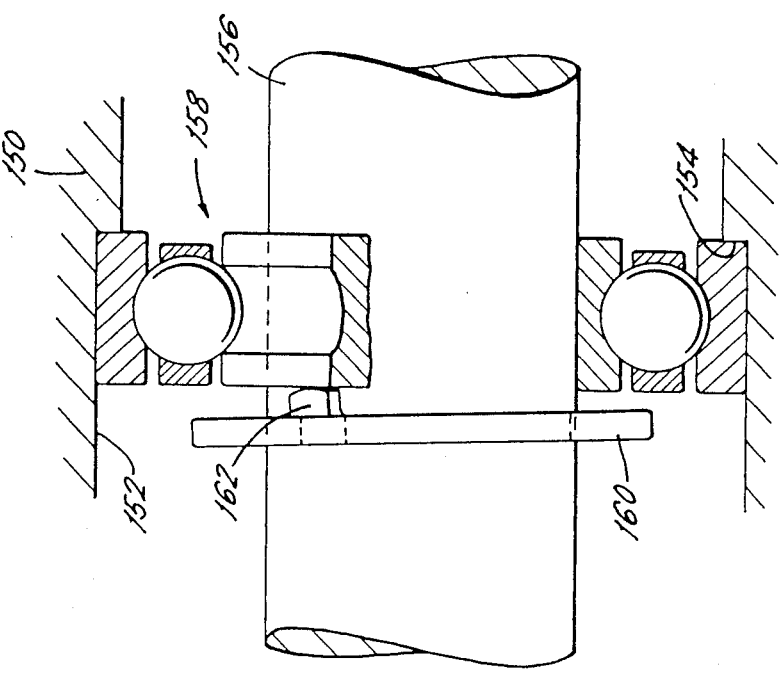

PREVENTING MOVEMENT OF AN ARTICLE ALONG A SHAFT OR BORE

This is a divisional of copending application(s) Ser. No. 06/815,566 filed on Jan. 2, 1986, now U.S. Pat. No. 4,887,919.

BACKGROUND AND FIELD OF THE INVENTION

This invention concerns an assembly comprising a housing having a bore, or a shaft, an article which is positioned in the bore or mounted on the shaft, and a device which is also positioned in the bore or mounted on the shaft and prevents movement of the article along the bore or the shaft in the direction from the article to the device.

Known ways of preventing an article, such as a rolling bearing, gear or the like, mounted on a shaft from moving in one direction include an abutment, for example a shoulder provided by the shaft. Movement in the other direction would be prevented by a circlip, or a collar through which extends retaining screws, or a nut co-operating with a screw-threaded on the shaft, or a clamp plate retained by bolts screwed into the end of the shaft.

Patent Specification GB No. 1392182 (Airscrew) (published Apr. 30, 1975) discloses an assembly which comprises a hub and a collar each with a bore through which a shaft extends. The collar is connected to the hub either integrally or by means of a screw and is held in a tilted position by another screw to produce a clamping effect. However this assembly is relatively complicated, so making production relatively expensive, and is bulky. Also difficulties can be experienced in mounting the hub and collar because of the screws.

Known ways of preventing movement of an article positioned in a bore of a housing include a circlip, or an externally screw-threaded nut, or an end cover or cap which is clamped to the housing with a suitably machined spigot or a shim placed between the cover or cap and the article.

These known ways suffer from various drawbacks: the groove for a circlip needs to be machined and carefully positioned. Even so with the build up of tolerance a clearance nay still arise between the circlip in the groove and the article resulting in an unacceptable movement. The use of a nut requires a screw-thread to be cut on a shaft or in the bore of a housing—which is a relatively expensive operation—and the provision of a means to prevent the nut from moving during use. Further, there can be difficulties in using tools to adjust the nut and to fasten the means to prevent the nut from moving. Collars which are retained by screws for example, can be difficult to place accurately and having a limited capability to prevent axial movement of an article. The use of a cover or cap requires screw-threaded bores to be produced in the housing or shaft by drilling and tapping. It also requires fitting by a skilled or highly experienced person to establish and fit suitable packing shims between the cover or cap and the article, or the machining of a suitable spigot which is integral with the cover or cap.

SUMMARY OF THE INVENTION

The subject of the invention is a device for preventing movement of an article along a bore or a shaft, which device is of simple construction, does not require special machining of the housing or shaft and is relatively simple to fit.

In one aspect the invention provides an assembly comprising a housing having a bore with a longitudinal axis, an article which is positioned in the bore and a device which is also positioned in the bore and which prevents movement of the article along the bore in the direction from the article to the device, the device comprising an element which during assembly can be moved along the bore and then caused to adopt a position in which it engages the article at one or more locations and engages the bore at two or more locations, the two or more locations of engagement with the bore lying in a first plane extending perpendicular to a second plane in which lies the longitudinal axis of the bore, the first plane forming an angle with a third plane extending perpendicular to the longitudinal axis of the bore which is no greater than $\tan^{-1}\mu$, where $\mu$ is the coefficient of friction between the bore and the element.

The following advantages can be gained by the use of the device in such an assembly: a minimum of machining of the housing; the device can be positioned at any suitable position along the length of the bore; simple and quick mounting and dismounting without substantially disturbing the surface of the bore; a self-locking feature in that force applied to the article to move it towards the element of the device significantly increases the retention force of the element; the device cannot accidentally be released by applying force to the element of the device in the direction towards the article if the article cannot move in that direction; and the device has an appearance more attractive than say a cover plate secured with a number of bolts.

Preferably the element is a flat plate which is inclined and substantially closes the bore. For a circular bore, the periphery of the plate will be an ellipse having a major axis which is slightly larger than the diameter of the bore, and a minor axis which is slightly smaller than the diameter of the bore. The size of the minor axis allows the plate to be moved along the bore. For lubricated steel a typical coefficient of friction $\mu=0.14$. This gives a maximum angle or slip angle $\phi=\tan^{-1}0.14=8°$. A preferred design angle is typically 0.05 radians (2.86°), thus making the length of the plate along the major axis about $1.001\times$ diameter of the bore.

To locate an article in a bore of a housing, that is to prevent the article from moving in one direction along the bore, the article is positioned in the bore at the desired location. The flat elliptical plate is moved along the bore and arranged so that the periphery of the plate at or adjacent to one end of the major axis lightly contacts a face of the article and the periphery at the two ends of the major axis contact the bore. A force is then applied to the surface of the plate facing away from the article at or adjacent to the periphery of the plate and at or adjacent to the other end of the major axis to urge the periphery of the plate at the two ends of the major axis into engagement with the bore. The force, directed axially of the bore in practice, will be equal to or greater than the reaction force required from the plate, that is, the non-slip reaction force. The force applied will result in a compressive force in the plate and equal and opposite radial forces in the housing bore generally at the locations of engagement with the plate on its major axis. Very little, if any, axial movement of the article will take place during this process. Any axial force, beyond that used to mount the plate, acting on the plate through the article or acting on the plate where the mounting force was applied will cause a small movement of the plate at this location which will rapidly generate an increase in the non-slip reaction force. The reaction force can be increased up to a substantial level beyond the normal or anticipated operating levels of the article.

With the article prevented from moving in the direction from the article to the plate by the plate, the angle that the major axis makes with a plane extending perpendicular to the axis of the bore will be no greater than the slip angle. For lubricated steel a typical slip angle is $\tan^{-1} 0.14 = 8°$ or 0.14 radians.

An elliptical plate is preferred for a circular bore since it can be dimensioned to substantially close the bore. However other designs of the element can be used involving more than two locations of engagement with the bore. In this case the locations of engagement lie in one plane. This plane extends perpendicular to a plane in which lies or extends the longitudinal axis of the bore. The angle to be considered then is the angle between the one plane and the plane extending perpendicular to the longitudinal axis of the bore.

In another aspect the invention provides an assembly comprising a shaft having a longitudinal axis, an article which is mounted on the shaft and a device which is also mounted on the shaft and prevents movement of the article along the shaft in the direction from the article to the device, the device comprising an element extending at least part the way round the shaft and which during assembly can be moved along the shaft and then caused to adopt a position in which it engages the article at one or more locations and engages the shaft at two or more locations which lie in a first plane extending perpendicular to a second plane in which lies the longitudinal axis of the shaft, wherein the first plane forms an angle with a third plane extending perpendicular to the longitudinal axis of the shaft which is no greater than $\tan^{-1}\mu$, where $\mu$ is the coefficient of friction between the shaft and the element, and the device only abuts the article.

The following advantages can be gained by the use of the device in such an assembly: a minimum of machining of the shaft; the device can be positioned at any suitable position along the length of the shaft; creates little or no pressure on the article; simple and quick mounting and dismounting without substantially disturbing the surface of the shaft; bending stresses are kept to a minimum since no screw-threads, grooves, dimples or other recesses in the surface of the shaft are required; a self-locking feature in that force applied to the article to move it towards the element of the device significantly increases the retention force of the element; and the device cannot accidently by released by applying force to the element of the device in the direction towards the article if the article cannot move in that direction.

Preferably the element is a ring and, for a cylindrical shaft the bore of the ring is preferably circular and of a diameter slightly greater than the diameter of the shaft.

To locate an article on a shaft, that is to prevent the article from moving in one direction along the shaft, the article is mounted on the shaft at the desired location. The ring is moved along the shaft and arranged so that a portion of the ring contacts the article and diametrically opposite parts of the inner bore periphery contact the shaft. A force is then applied to the ring, at a location diametrically opposite to that of the portion contacting the article, and in a direction from the ring to the article, to urge the diametrically opposite parts of the inner bore periphery into engagement with the shaft. Depending on the shape of the article, the ring may or may not require one or more projections to engage the article. The force directed axially with respect to the shaft in practice, will be equal to or greater than the reaction force required from the ring, that is, the non-slip reaction force.

With the article prevented from moving along the shaft, in the direction from the article to the ring, by the ring, the angle that a diametral line of the ring, joining the locations of engagement of the ring with the shaft, makes with a plane extending perpendicular to the axis of the shaft will be not greater than the slip angle. For lubricated steel, a typical coefficient of friction $\mu = 0.14$. The slip angle $\phi = \tan^{-1}\mu = 0.14$ radians or 8°. The diameter of the bore of the ring can then be within the limits of the diameter of the shaft + H6 (as defined in British Standard 1916: Part 1: 1953 Housing Limits).

A ring is a preferred shape of element for a shaft since it is relatively easy to make although other shapes are possible for example, a horse-shoe shape. The ring may engage the shaft at more than two locations. In this case the locations of engagement lie in one plane. This plane extends perpendicular to a plane in which lies or extends the longitudinal axis of the shaft. The angle to be considered then is the angle between the one plane and the plane extending perpendicular to the longitudinal axis of the shaft.

The element, that is in the specific examples, the flat plate or the ring, can be made of metal, ferrous or non-ferrous, or plastics and can be produced by moulding, machining or pressing.

BRIEF DESCRIPTION OF THE DRAWINGS

Of the drawings:

FIG. 3 is a longitudinal section through a second embodiment of the invention in which a bearing mounted on a shaft, is located in the bore of a housing by two flat elliptical plates, the shaft passing through apertures in the plates;

FIG. 4 is a view from the left and along the axis of the assembly shown in FIG. 3;

FIG. 5 is a section on V—V of the assembly shown in FIG. 3;

FIG. 6 is a longitudinal section on VI—VI through a third embodiment of the invention shown in FIG. 7 in which a bearing, mounted on a shaft, is located by two flat elliptical plates, the outer one engaging the bearing at two spaced locations;

FIG. 7 is a view from the left and along the axis of the axis of the assembly shown in FIG. 6;

FIG. 8 is a section on VIII—VIII of the assembly shown in FIG. 6;

FIG. 13 is a longitudinal section through a sixth embodiment of the invention in which a bearing, positioned in the bore of a housing, is located on shaft by a ring having three locations of engagement with the shaft and two locations of engagement with the bearing;

FIG. 14 is a view from the left and along the axis of the assembly shown in FIG. 13.

DESCRIPTION OF THE PREFERRED EMBODIMENTS

Figure 2:
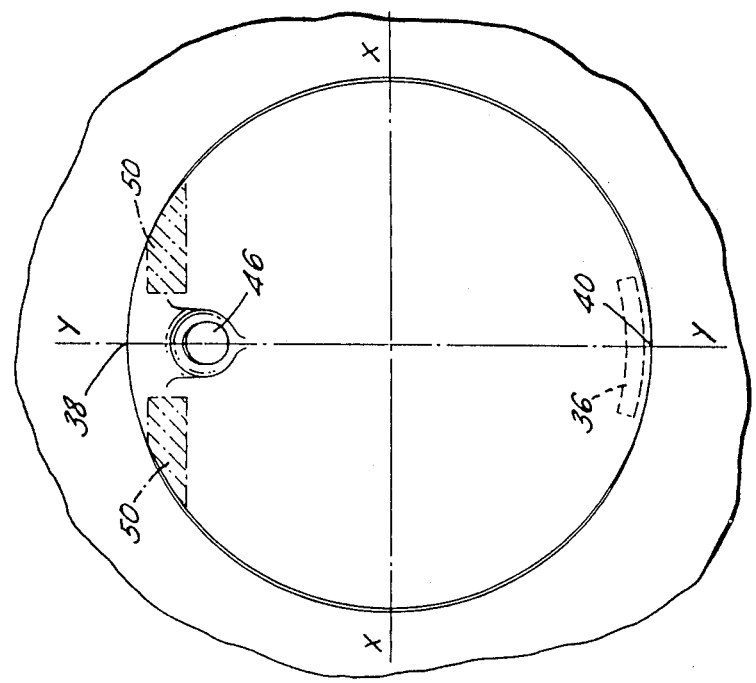
FIG. 2 is a view from the left and along the axis of the assembly shown in FIG. 1.
Figure 1:
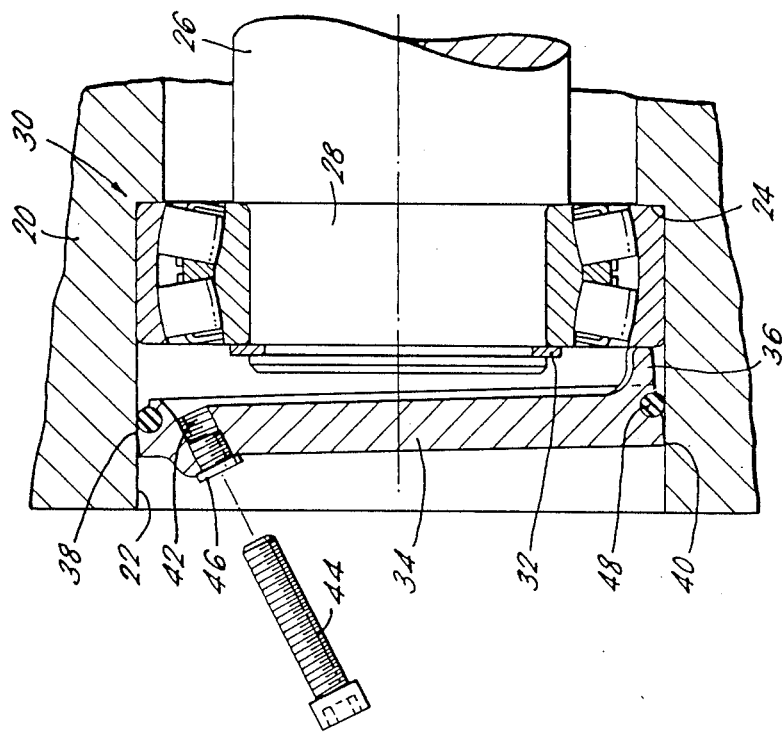
FIG. 1 is part of a longitudinal section through a first embodiment of the invention in which a bearing, mounted on a shaft, is located in the bore of a housing by a single flat elliptical plate.

The assembly shown in FIGS. 1 and 2 comprises a housing 20 having a cylindrical bore 22 with a shoulder 24. A cylindrical shaft 26 extends within the housing 20 and has a stepped end 28 on which a spherical roller bearing 30 is mounted with a force fit. The bearing 30 is located on the shaft 26 between the shoulder formed by the stepped end 28 and a circlip 32 engaging in a groove in the stepped end. The bearing 30 is a free sliding fit in the bore 22 and is prevented from moving along the bore 22 in one axial direction by the shoulder 24.

The bearing 30 is prevented from moving in the other axial direction along the bore 22 by a flat elliptical plate 34 which substantially closes the bore. The plate 34 has a dimension along the minor axis X—X which is slightly less than the diameter of the bore, which allows the plate to be moved along the bore, and a dimension along the major axis Y—Y which is slightly greater than the diameter of the bore, typically 1.001×the mean diameter of that portion of the bore in which it is mounted. The plate 34 has a projection 36 which lies on the major axis Y—Y and engages the outer ring of the bearing 30. The plate 34 engages the bore 22 of the housing 20 at two locations 38 and 40 which lie on the periphery of the plate and on the major axis Y—Y. These two locations 38 and 40 lie in a first plane extending perpendicular to a second plane in which lies the longitudinal axis of the bore 22. The second plane is the plane of the drawing. A third plane extends perpendicular to the longitudinal axis of the bore 22. The first and third planes form an angle which is no greater than $\tan^{-1}\mu$, where $\mu$ is the coefficient of friction between the bore 22 and the plate 34.

The flat plate 34 is inclined due to the size of it along the major axis and the projection 36 extends from that portion of the plate which is nearer the bearing 30.

The plate 34 has a screw-threaded bore 42 which lies on the major axis Y—Y and at that portion of the plate further from the projection 36. The bore 42 is intended for reception of a screw-threaded element 44 and is shown closed by a plastics plug 46.

An elastically deformable ring 48 of, for example, rubber or plastics, engages in a groove in the outer periphery of the plate 34 and forms a seal between the plate and the bore 22.

The plate 34 is mounted by being passed along the bore 22 and then adjusted so that the projection 36 lightly contacts the bearing 30 and the portions of the plate periphery lying on the major axis Y—Y contact the bore. A tool is then placed to engage the shaded area 50 of a portion of the plate 34 lying further from the bearing 30 and force is applied until the required non-slip reaction force is achieved, that is, the plate adopts a position with an angle below the described slip angle of $\tan^{-1}\mu$. The shaded area 50 of tool engagement is at or adjacent to the outer periphery of the plate and on or adjacent to the major axis Y—Y.

To dismount the plate 34, the plastics plug 46 is removed from the bore 42 and the screw 44 is inserted and screwed in to engage the outer ring of the bearing 30. The screw 44 is tightened until it overcomes the non-slip reaction force and thereby releases the plate 34.

This assembly described and illustrated has the plate 34 engaging the bearing 30 at one fairly specific location. This is suitable for articles such as self-aligning bearings in which a degree of movement from the plane perpendicular to the axis is acceptable.

FIGS. 3, 4 and 5 show an assembly comprising a housing 52 having a cylindrical bore 54. A cylindrical shaft 56 extends within the bore 54 and has a stepped end 58 on which a single-row deep-groove radial ball bearing 60 is mounted. Preferably in this assembly, at least two opposed contacts are used to locate and retain the bearing.

To prevent movement of the bearing 60 along the bore 54 in one axial direction two flat elliptical plates 62 and 64 are provided, each substantially closing the bore 54, the stepped end 58 of the shaft 56 passing with clearance centrally through apertures in the plates. Each plate 62, 64 has a dimension along the minor axis X—X which is slightly smaller than the diameter of the bore 54, which allows each plate to be moved along the bore, and a dimension along the major axis Y—Y which is slightly greater than the diameter of the bore, typically 1.001×the mean diameter of the bore. Each plate 62, 64 is inclined and converges with each other and with a plane extending perpendicular to the longitudinal axis of the bore 54 and lying between the plates.

The plate 64 engages the outer ring of the bearing 60 at a location 66 on the major axis Y—Y and at a portion of the periphery of the plate closer to the bearing. The plate 64 engages the bore 54 of the housing 52 at two locations 68 and 70 which lie on the outer periphery of the plate and on the major axis Y—Y. These two locations of engagement 68 and 70 lie in a first plane extending perpendicular to a second plane in which lies the longitudinal axis of the bore 54. A third plane extends perpendicular to the longitudinal axis of the bore 54. The first and third planes from an angle which is no greater than $\tan^{-1}\mu$, where $\mu$ is the coefficient of friction between the bore 54 and plate 64.

Similarly the plate 62 engages the bore 54 of the housing 52 at two locations 72 and 74 which lie on the outer periphery of the plate and on the major axis Y—Y. These two locations of engagement 72 and 74 lie in a first plane extending perpendicular to a second plane in which lies the longitudinal axis of the bore 54. A third plane extends perpendicular to the longitudinal axis of the bore 54. The first and third planes form an angle which is no greater than $\tan^{-1}\mu$, where $\mu$ is the coefficient of friction between the bore 54 and plate 62.

The plate 62 has a projection or pin 76 which lies on the major axis Y—Y and on a portion of the outer periphery of the plate nearer the bearing 60. The pin 76 extends through a recess or cut-out 78 in the outer periphery of the plate 64 and engages the outer ring of the bearing 60 at as location 80 diametrically opposite to the location 66 of engagement of the plate 64.

The plate 64 is mounted by being passed along the bore 54 and then adjusted so that the portion of the plate adjacent to its outer periphery and lying diametrically opposite to cut-out 78 on the major axis Y—Y contacts the outer ring of the bearing 60 and so that portions of the outer periphery of the plate lying on the major axis Y—Y contact the bore. A tool is then placed to engage the shaded area 82 of the plate 64, which shaded area is at or adjacent to the outer periphery of the plate and on or adjacent to the major axis Y—Y. The shaded area 82 is also a portion of the plate 64 lying further from the bearing 60. Force is applied to the plate 64 until the required non-slip reaction force is achieved, that is, the plate adopts a position with an angle below the described slip angle of $\tan^{-1}\mu$.

The plate 62 is then mounted by being passed along the bore 54 and then adjusted so that the pin 76 extends through the cut-out 78 in the plate 64 and contacts the outer ring of the bearing 60 and portions of the periphery of the plate lying on the major axis Y—Y contact the bore. A tool is then placed to engage the shaded are 84 of a portion of the plate 62 lying further from the bearing 60. The force is applied until the required non-slip reaction force is achieved, that is, the plate adopts a position with an angle below the described slip angle of $\tan^{-1}\mu$. The shaded area 84 of engagement by the tool is also at or adjacent to the outer periphery of the plate 62 and on or adjacent to the major axis Y—Y. To assist in locating the tool in the correct region, the plate 62 has an indentation 86.

When mounting the plates 62 and 64, a clearance between where the plates are closer to each other is essential to avoid the need for close tolerance control and to ensure that the pin 76 comes into contact with the outer bearing ring.

The assembly shown in FIGS. 6, 7 and 8 comprises a housing 88 having a cylindrical bore 90. A cylindrical shaft 92 extends within the bore 90 and has a stepped end 94 on which a taper roller bearing 96 is mounted. A bearing of this type requires to be axially located/adjusted to control its internal clearance and be supported so as to maintain a correct running geometry such that the outer ring is supported in a plane parallel to that of the inner ring. Hence to prevent movement of the bearing 96 along the bore 90 in one axial direction two flat elliptical plates 98 and 100 are provided each substantially closing the bore and each contacting the outer bearing ring at two spaced locations. Each plate 98, 100 has a dimension along the minor axis X—X which is slightly smaller than the diameter of the bore 90, which allows each plate to be moved along the bore, and a dimension along the major axis Y—Y which is slightly greater than the diameter of the bore, typically 1.001×the mean diameter of the bore. Each plate is inclined and converges with the other and with a plane extending perpendicular to the longitudinal axis of the bore 90 and lying between the plates.

The plate 100 has two projections 102, in the form of pins, which extend from a portion of the plate 100 which is nearer to the bearing 96 and is adjacent to the outer periphery of the plate. The pins 102 are also adjacent to and lie on opposite sides of the major axis Y—Y. The plate 100 engages the bore 90 at two locations 104 and 106 which lie on the outer periphery of the plate and on the major axis Y—Y. These two locations 104 and 106 lie in a first plane extending perpendicular to a second plane in which lies the longitudinal axis of the bore 90. A third plane extends perpendicular to the longitudinal axis of the bore 90. The first and third planes form an angle which is no greater than $\tan^{-1}\mu$, where $\mu$ is the coefficient of friction between the bore and the plate 100.

Similarly the plate 98 engages the bore 90 of the housing 88 at two locations 108 and 110 which lie on the outer periphery of the plate and on the major axis Y—Y. These two locations of engagement 108 and 110 lie in a first plane extending perpendicular to a second plane in which lies the longitudinal axis of the bore 90. A third plane extends perpendicular to the longitudinal axis of the bore 90. The first and third planes form an angle which is no greater than $\tan^{-1}\mu$, where $\mu$ is the coefficient of friction between the plate 98 and the bore 90.

The plate 98 has two projections 112, in the form of pins, which extend through respective recesses or cut-outs 114 in the outer periphery of the plate 100 and engage the outer bearing ring. These pins 112 extend from a portion of the plate 98 which is nearer to the bearing 96 and is adjacent to the outer periphery of the plate. The pins are also adjacent to and lie on opposite sides of the major axis Y—Y.

An elastically deformable ring 116 of, for example, rubber or plastics, engages in a groove in the outer periphery of the plate 98 and forms a seal between the plate and the bore 90.

The plate 100 is mounted by being passed along the bore 90 and then adjusted so that the pins 102 contact the outer ring of the bearing 96 and so that portions of the outer periphery of the plate lying on the major axis Y—Y contact the bore. A tool is then placed to engage the shaded area 118 of the plate 100, which shaded area is a portion of the plate lying further from the bearing 96. The shaded area 118 is at or adjacent to the outer periphery of the plate 100 and on or adjacent to the major axis Y—Y. Force is applied to the shaded area 118 of the plate 100 until the required non-slip reaction force is achieved, that is, the plate adopts a position with an angle below the described slip angle of $\tan^{-1}\mu$.

The plate 98 is then mounted by being passed along the bore 90 and then adjusted so that the pins 112 extend through the cut-outs 114 in the plate 100 and contact the outer ring of the bearing 96 and portions of the outer periphery of the plate lying on the major axis Y—Y contact the bore. A tool is then placed to engage the shaded area 120, which shaded area is a portion of the plate lying further from the bearing 96. The shaded area 120 is at or adjacent to the outer periphery of the plate 98 and on or adjacent to the major axis Y—Y. Force is then applied to the shaded area 120 until the required non-slip reaction force is achieved, that is, the plate adopts a position with an angle below the described slip angle of $\tan^{-1}\mu$.

When mounting the plates 98 and 100, a clearance between where the plates are closer to each other is essential to avoid the need for close tolerance control and to ensure that the pins 112 come into contact with the outer ring of the bearing 96.

To dismount the plates 98 and 100, each plate has a screw-threaded bore 122, 124 respectively which lies on the major axis Y—Y and at that portion of the plate further from the bearing 96. Each bore 122, 124 receives a screw which upon tightening engages the plate 100 or bearing 96 respectively and over comes the non-slip reaction force and thereby release the plate 98, 100.

The type of assembly shown in FIGS. 6, 7 and 8 is most suitable for taper roller bearing applications involving modest speed and where zero axial clearance is desirable or can be tolerated. A typical example is an output shaft worm gear.

Figure 10:
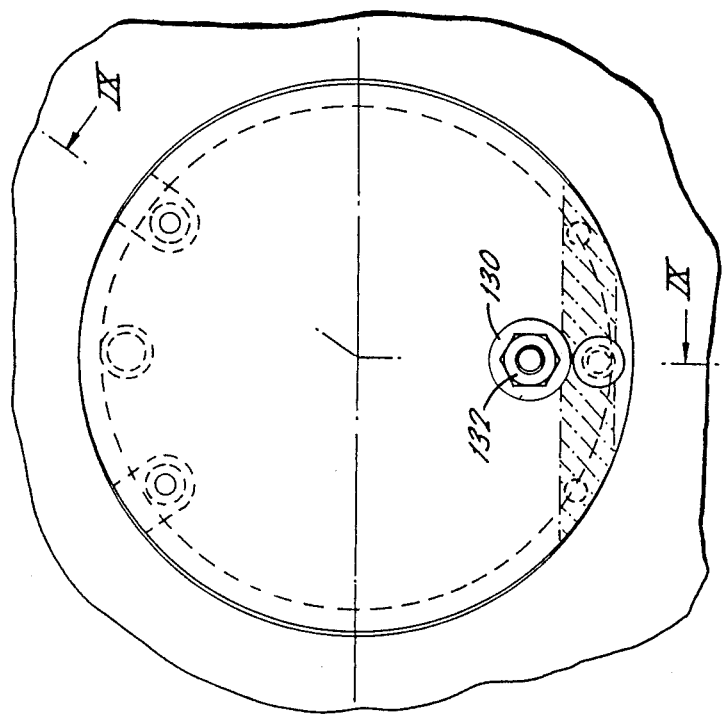
FIG. 10 is a view from the left and along the axis of the assembly shown in FIG. 9.
Figure 9:
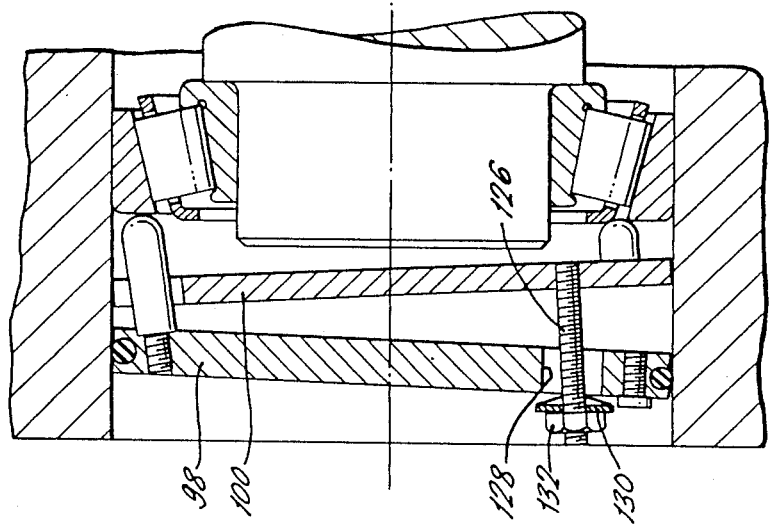
FIG. 9 is a longitudinal section on IX—IX through a fourth embodiment of the invention shown in FIG. 10 in which a bearing, mounted on a shaft, is located by two flat elliptical plates with a threaded stud engaging both plates.

FIGS. 9 and 10 show an assembly similar in all essential respects to that shown in FIGS. 6, 7 and 8 except for one: a stud 126 fixed to the in-board plate 100 passes with clearance through an aperture 128 in plate 98. On the free end of the stud 126 are a bevelled washer 130 and a nut 132. When the assembly is complete, the nut 132 is done up lightly to ensure that the plates 98 and 100 do not move axially relative to each other.

Figure 12:
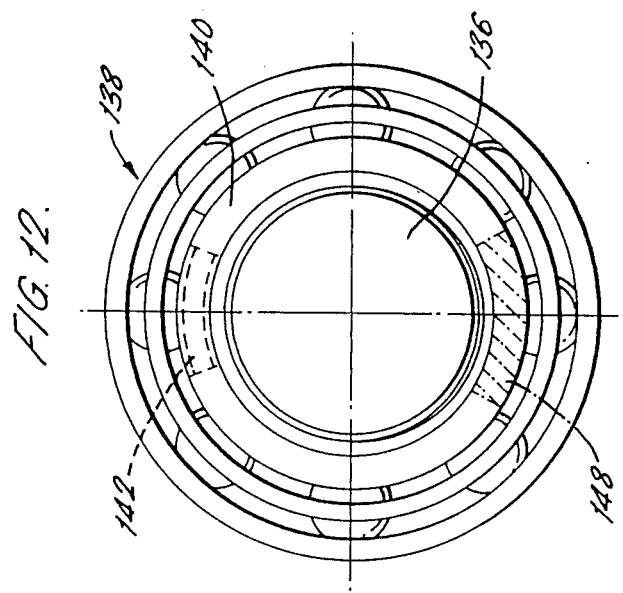
FIG. 12 is a view from the left and along the axis of the assembly shown in FIG. 11.
Figure 11:
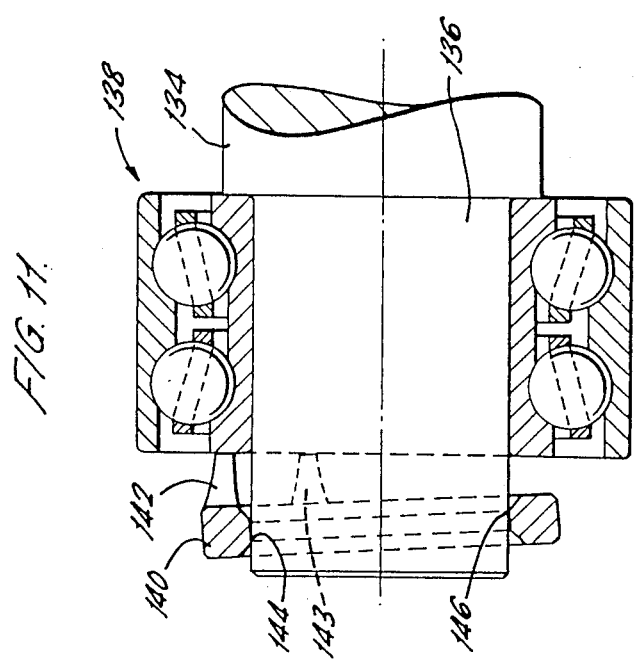
FIG. 11 is a longitudinal section through a fifth embodiment of the invention in which a bearing is located on a shaft by a ring.

FIGS. 11 and 12 show an assembly comprising a cylindrical shaft 134 having a stepped end 136 forming a shoulder. A double row angular-contact ball bearing 138 is mounted on the stepped end 136 abutting the shoulder. The bearing 138 is prevented from moving along the shaft end 136 away from the shoulder by a ring 140 mounted on the shaft. The ring 140 has inner bevelled edges and a circular bore which is slightly greater than the diameter of the stepped end 136 of the shaft 134 (a clearance fit) and has a projection or nose 142 extending from one end face and engaging the inner ring of the bearing 138. The ring 140 is tilted and engages the shaft end 136 at two diametrically opposed locations 144, 146 one of which, 144, is aligned with the projection 142. These locations of engagement lie in a first plane extending perpendicular to a second plane which includes the longitudinal axis of the shaft 134. A third plane extends perpendicular to the longitudinal axis of the shaft 134. The first and third planes form an angle which is no greater than $\tan^{-1}\mu$, wherein $\mu$ is the coefficient of friction between the shaft 134 and the ring 140.

To mount the ring 140 it is simply slid along the shaft end 136 until the nose 142 contacts the inner bearing ring. Then an axial force is applied to the shaded area 148, which is at a location on the portion of the ring nearer the bearing 138, is diametrically opposite to the projection 142 and on the opposite end face, until the required non-slip reaction force is achieved, that is, the ring 140 adopts a position with an angle below the described slip angle of $\tan^{-1}\mu$.

When the axial force is applied to shaded area 148, there is a very slightly pivoting movement of the ring 140 about location 144, causing the nose 142 to move away very slightly from the bearing 138. This embodiment can be varied by replacing the one nose 142 by two noses 143 (shown in broken line) which are located on opposite sides of location 144. When, in this case, the axial force is applied to the shaded are 148, the very slight pivoting movement of the ring 140 will urge the noses 143 towards the bearing 138.

In this assembly, there must be a gap between the portion of the ring 140 nearer the bearing 138 and the bearing to avoid close tolerances in manufacture and assembly and ensure that the projection 142 engages the bearing.

The retaining force has the same value as the axial load applied. Any additional movement of the bearing 138 beyond this load will cause a slight movement of the ring 140 resulting in a self-locking force in increasing intensity up to the strength of the ring.

The assembly shown in FIGS. 13 and 14 comprises a housing 150 having a bore 152 with a reduced diameter portion providing a shoulder 154. A shaft 156 is mounted in the bore 152 by a single row deep-groove radial ball bearing 158 abutting the shoulder 154. To prevent the bearing 158 moving along the bore 152 and away from the shoulder 154 a ring 160 is mounted on the shaft 156 and is tilted. The ring 160 has two projections 162 engaging the inner ring of the bearing 158. The ring 160 has two radially inwardly extending projections 164 and a third projection 165, the inside edges of which lie on a circle of a diameter larger than that of the shaft 156, and engage the shaft 156. The two projections 164 are aligned with respective ones of the projections 162 engaging the bearing 158, and the remaining projection 165 is at a portion of the ring closer to the bearing and spaced midway between the other two projections 164 at an angle of about 125°. The three projections 164 and 165 engage the shaft 156 at three locations which lie in a first plane extending perpendicular to a second plane which includes the longitudinal axis of the shaft 156. A third plane extends perpendicular to the longitudinal axis of the shaft 156. The first and third planes form an angle which is no greater than $\tan^{-1}\mu$, where $\mu$ is the coefficient of friction between the shaft 156 and the ring 160.

To mount the ring 160 it is simply slid along the shaft 156 until the two projections 162 contact the inner ring of the bearing 158. Then an axial force is applied to the shaded area 166 at a region at or adjacent to the projection 165 until the required non-slip reaction force is achieved, that is, the ring 160 adopts a position with an angle below the described slip angle of $\tan^{-1}\mu$.

When the axial force is applied to the shaded area 166, there is a very slight pivoting movement of the ring 160 about a line joining the locations where the projections 164 engage the shaft 156. However, since in this assembly the projections 162 are aligned with the projections 164, there is virtually no movement of the projections 162.

As in the previous embodiment there must be a gap between the portion of the ring 160 nearer the bearing 158 and the bearing to avoid close tolerances in manufacture and assembly and to ensure that the projections 162 engage the bearing.

In these last two embodiments the ring 140, 160 must have a high stiffness as well as strength in order to avoid the angle exceeding $\tan^{-3}\mu$, that is, the slip angle. A most suitable material is cast steel or cast spheroidal graphite iron.

In certain circumstances, two rings may be required. Also, a ring as such is not necessary since an incomplete or broken ring much like a horse-shoe could be used. Three or four or more locations of engagement with the shaft and bearing may be employed.

To achieve an axial clearance between a ring and, for example a bearing, a temporary shim can be positioned between the projection(s) or nose(s) and the bearing. After locking the ring, the shim is then removed radially. Thus a controlled axial clearance can be readily achieved.

In the first four embodiments, FIGS. 1 to 10, a flat plate is chose because it can be manufactured relatively easily, is easy to handle and fit. However, other shapes of elements can be adopted which can be like a letter Y or, in the extreme case, can be a rod.

Figure 15:
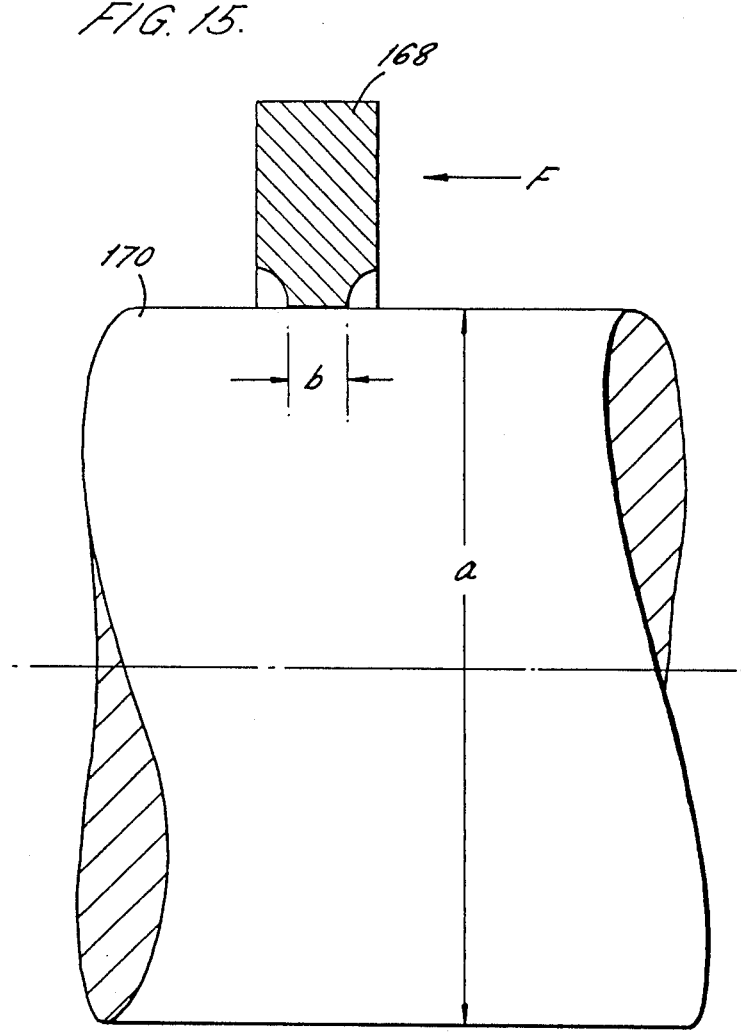
FIG. 15 is a longitudinal section of a ring surrounding a shaft in which dimensional interrelationships were investigated.

Referring to FIG. 15, an investigation was made to discover the relationship between the axial dimension b of the cylindrical bore of a ring or washer 168 and the diameter a of a shaft 170 which extends through the bore of the ring concerning locking of the ring on the shaft. The diameter a of the shaft 170, and the diameter of the bore of the ring 168 had the same nominal diameter of 35 mm, although the ring was a clearance fit on the shaft. Both the ring 168 and the shaft 170 were made of steel, with the ring having approximately an 18 ton per square inch (2.8 tonne per square centimeter) yield and the shaft having approximately a 30 ton per square inch (4.7 tonne per square centimeter) yield. The investigation was started with a dimension b of 25 mm. A force F of 576 lb of (2.56 kN) was applied to the ring 168 as indicated by the arrow. The ring 168 did not lock or jam on the shaft 170. Rings with other dimensions b were tried and the results are summarized in the table below:

| a mm | b mm | a/b | locking or jamming |
|---|---|---|---|
| 35 | 25 | 1.4 | NO |
| 35 | 20 | 1.75 | NO |
| 35 | 15 | 2.3 | NO |
| 35 | 10 | 3.5 | NO |
| 35 | 7 | 5 | Slight |
| 35 | 5 | 7 | YES, but ring moved by thumb pressure |
| 35 | 4.5 | 7.8 | YES |
| 35 | 3 | 11.66 | YES, good |
| 35 | 1.3 | 26.92 | YES, very good, no marking of shaft |

From the table one can see that for a ratio of a/b<8 there was no or unsatisfactory locking but for a ratio of a/b>8 there was satisfactory locking. A value of a/b>12 is preferred to ensure satisfactory locking of the ring on the shaft.

I claim:

1. An assembly comprising a housing having a bore with a longitudinal axis, an article which is positioned in the bore and a device which is also positioned in the bore and which prevents movement of the article along the bore in the direction from the article to the device, the device comprising a first element disposed entirely within said bore and frictionally engaging an interior wall of said bore which element during assembly can be moved along the bore and then caused to adopt a position in which it engages the article at one or more locations and engages the bore at two or more locations without deformation of said bore, said element having a minor axis no greater than the diameter of said bore and having a major axis greater than the diameter of said bore, the two or more locations of engagement with the bore lying in a first plane extending perpendicular to a second plane in which lies the longitudinal axis of the bore, the first plane forming an angle with a third plane extending perpendicular to the longitudinal axis of the bore which is greater than zero but no greater than $\tan^{-1}\mu$, where $\mu$ is the coefficient of friction between the bore and the element wherein the device includes a second element having the same dimensional relationships with respect to the bore as the first element, the first and second elements not engaging each other, the second element engaging the article at one or more locations and engaging the bore at two or more locations, the two or more locations of engagement of the second element with the bore lying in a fourth plane forming an angle with the third plane which is no greater than $\tan^{-1}\mu$, the first and the third and the fourth planes converging with one another with the third plane laying between the first and fourth planes.

2. An assembly as claimed in claim 1, wherein the two elements are generally flat plates which are inclined and substantially close the bore.

3. An assembly as claimed in claim 2, wherein the first plate has one or more projections at or adjacent to that portion of the first plate which is nearer the article, which projection or projections engage the article.

4. An assembly as claimed in claim 2, wherein the first plate has one or more recesses or apertures at or adjacent to that portion of the first plate which is further from the article, the second plate has one or more projections at or adjacent to that portion of the second plate which is nearer the article, and the or each projection extends through the or a respective one of the recesses or apertures in the first plate and engages the article.

5. An assembly as claimed in claim 2, wherein the first plate has a screw-threaded bore in or adjacent to that portion of the first plate which is further from the article for reception of a screw-threaded element to engage the article and dismount the first plate.

6. An assembly as claimed in claim 2, wherein the second plate has a screw-threaded bore in or adjacent to that portion of the second plate which is further from the first plate for reception of a screw-threaded element to engage the first plate and dismount the second plate.

7. An assembly as claimed in claim 2, wherein a screw-threaded element extends with clearance through an aperture or recess in the second plate and engages in a screw-threaded bore in the first plate, and a nut engages the free end of the screw-threaded element so that the plates are connected to each other where they are spaced further away from each other.

8. An assembly as claimed in claim 2, wherein a resiliently deformable member forms a seal between the outer periphery of one plate and the bore.

9. An assembly as claimed in claim 2, wherein the article is mounted on a shaft extending through an aperture in the first plate or apertures in both plates.

* * * * *